United States Patent
Ostling et al.

(10) Patent No.: US 10,836,336 B2
(45) Date of Patent: Nov. 17, 2020

(54) ADAPTING SAFETY MECHANISMS OF A VEHICLE SAFETY SYSTEM

(71) Applicant: VEONEER SWEDEN AB, Vargarda (SE)

(72) Inventors: Martin Ostling, Bramhult (SE); Nicklas Gustafsson, Gothenburg (SE)

(73) Assignee: VEONEER SWEDEN AB, Vargarda (CH)

( * ) Notice: Subject to any disclaimer, the term of this patent is extended or adjusted under 35 U.S.C. 154(b) by 241 days.

(21) Appl. No.: 15/574,736

(22) PCT Filed: May 17, 2016

(86) PCT No.: PCT/EP2016/061007
§ 371 (c)(1),
(2) Date: Nov. 16, 2017

(87) PCT Pub. No.: WO2016/184847
PCT Pub. Date: Nov. 24, 2016

(65) Prior Publication Data
US 2018/0201212 A1     Jul. 19, 2018

(30) Foreign Application Priority Data
May 19, 2015   (EP) .................................... 15168093

(51) Int. Cl.
| B60R 21/0132 | (2006.01) |
| B60R 21/013 | (2006.01) |
| B60R 21/0134 | (2006.01) |
| B60R 21/01 | (2006.01) |
| B60T 7/12 | (2006.01) |

(52) U.S. Cl.
CPC ........ B60R 21/0132 (2013.01); B60R 21/013 (2013.01); B60R 21/0134 (2013.01);
(Continued)

(58) Field of Classification Search
CPC .............. B60R 21/0132; B60R 21/013; B60R 21/0134; B60R 2021/01252;
(Continued)

(56) References Cited

U.S. PATENT DOCUMENTS

| 5,541,590 A | 7/1996 | Nishio |
| 6,405,132 B1 | 6/2002 | Breed et al. |

(Continued)

FOREIGN PATENT DOCUMENTS

| DE | 199 38 891 A1 | 2/2001 |
| DE | 10 2007 039 039 A1 | 1/2009 |

(Continued)

OTHER PUBLICATIONS

International Search Report and the Written Opinion of PCT/EP2016/061007 dated Aug. 10, 2016.

*Primary Examiner* — Jaime Figueroa
(74) *Attorney, Agent, or Firm* — Dickinson Wright PLLC

(57) ABSTRACT

A method and a device for a motor vehicle of adapting safety mechanisms of a vehicle safety system. The method includes acquiring (s101) data to create a representation (113) of a current vehicle surrounding (110), comparing (s102) the created representation to pre-stored representations of vehicle surroundings, with a risk assessment measure (R) associated with it which stipulates whether to trigger the safety mechanism of the vehicle safety system. If there is correspondence between the created representation and one of the pre-stored representations; detecting (s103) a vehicle behavior associated with the current surrounding, and determining (s104), whether to adjust triggering of the safety mechanism associated with the at least one risk assessment measure of the pre-stored representation of the current vehicle surrounding for which there is a match with the created representation.

17 Claims, 6 Drawing Sheets

(52) U.S. Cl.
CPC ............... *B60R 2021/01211* (2013.01); *B60R 2021/01252* (2013.01); *B60R 2021/01259* (2013.01); *B60R 2021/01322* (2013.01); *B60R 2300/301* (2013.01); *B60R 2300/302* (2013.01); *B60R 2300/8093* (2013.01); *B60T 7/12* (2013.01)

(58) Field of Classification Search
CPC .. B60R 2021/01322; B60R 2300/8093; B60R 2300/302; B60R 2300/301; B60R 2021/01259; B60R 2021/01211; B60T 7/12
USPC .......................................................... 701/1, 45
See application file for complete search history.

(56) References Cited

U.S. PATENT DOCUMENTS

| | | | |
|---|---|---|---|
| 6,433,442 B1* | 8/2002 | Mackel | B60R 16/03 307/10.1 |
| 7,783,426 B2 | 8/2010 | Kato et al. | |
| 2003/0139881 A1* | 7/2003 | Miller | B60R 21/013 701/301 |
| 2003/0209893 A1* | 11/2003 | Breed | B60J 10/00 280/735 |
| 2006/0025897 A1* | 2/2006 | Shostak | B60C 23/005 701/1 |
| 2006/0235615 A1* | 10/2006 | Kato | B60W 40/04 701/300 |
| 2007/0131468 A1* | 6/2007 | Bullinger | B60R 21/013 180/282 |
| 2007/0225882 A1* | 9/2007 | Yamaguchi | B60W 30/095 701/36 |
| 2008/0040003 A1 | 2/2008 | Kroeninger et al. | |
| 2018/0201227 A1* | 7/2018 | Gao | B60R 25/305 |
| 2019/0001908 A1* | 1/2019 | Chu | B60R 21/017 |

FOREIGN PATENT DOCUMENTS

| | | |
|---|---|---|
| EP | 0 582 236 B1 | 6/1998 |
| JP | H 06-60300 A | 3/1994 |
| JP | 2002-042294 A | 2/2002 |
| JP | 2007-004521 A | 1/2007 |
| WO | WO 2009/096827 A1 | 8/2009 |

* cited by examiner

ADAPTING SAFETY MECHANISMS OF A VEHICLE SAFETY SYSTEM

CROSS-REFERENCE TO RELATED APPLICATIONS

This application is a 35 U.S.C. § 371 national phase application of PCT International Application No.: PCT/EP2016/061007, filed May 17, 2016, which claims the benefit of priority under 35 U.S.C. § 119 to European Patent Application No.: 15168093.1, filed May 19, 2015, the contents of which are incorporated herein by reference in their entirety.

FIELD OF THE INVENTION

The invention relates to a method and a device at a vehicle of adapting safety mechanisms of a vehicle safety system.

BACKGROUND

In many traffic situations, it is desirable to have knowledge about the surroundings of a vehicle. This is particularly helpful in case the vehicle, being for instance a passenger car, incorporates a vehicle safety system which activates safety functions based on events occurring in the surroundings.

For example, assuming that the car approaches and enters an intersection crowded with traffic and the driver of the car does decrease the speed sufficiently as e.g. stipulated to a threshold value, the vehicle safety system may cause the car to slow down based on its observations of the surroundings. In another example, in case the car enters a stretch of road where signposts indicate plentiful existence of game, the vehicle safety system may indicate so correspondingly via for instance a visual indication on an instrument panel display of the car.

US 2008/0040003 discusses that a problem in the art is to control a safety system to trigger safety system restraint system, such as air bags, safety belts, and the like, at a very early point in time in a potential crash situation, while at the same time achieving a high degree of safety against misuse or unintended actuation. Hence, the decision to trigger restraint means should only be taken if a corresponding risk to the occupants of the vehicle actually exists. A high degree of safety against misuse is required in order to prevent unnecessary triggering of restraint means, since unnecessary triggering may result in expensive repairs to the safety system.

The system of US 2008/0040003 proposes a solution to this problem in the form of a safety system utilizing data from a vehicle navigation system in order to determine the location of the vehicle with a high degree of precision, and based on the these data, evaluate the probability of an angular or side crash, thus enabling an early safety system triggering decision. Alternatively, if in a different situation the data of the navigation system do not contain any indication of an intersection or a junction with a side street, and the vehicle is moving in an orderly fashion in its lane, then the probability of a side crash is to be evaluated as comparatively low, in which case a triggering threshold may be raised.

However, a problem with evaluating the potential dangers based on location data is that only a very coarse evaluation can made as it does not take into account the actual conditions of the surroundings of the vehicle.

SUMMARY AND INTRODUCTORY DESCRIPTION OF THE INVENTION

An object of the present invention is to solve, or at least mitigate, this problem in the art and to provide an improved method and device of adapting safety mechanisms of a vehicle safety system.

This object is attained in a first aspect of the invention by a method for a vehicle of adapting safety mechanisms of a vehicle safety system. The method includes acquiring data to create a representation of a current vehicle surrounding, comparing the created representation to a plurality of pre-stored representations of vehicle surroundings, each having at least one risk assessment measure associated with it which stipulates whether to trigger at least one safety mechanism of the vehicle safety system, and if there is correspondence between the created representation and one of the pre-stored representations; detecting a vehicle behavior associated with the current surrounding, and determining, based on the detected vehicle behavior, whether to adjust triggering of the at least one safety mechanism associated with the at least one risk assessment measure of the pre-stored representation of the current vehicle surrounding for which there is a match with the created representation.

The above object is attained in a second aspect of the invention by a device of a vehicle configured to adapt safety mechanisms of a vehicle safety system. The device includes a sensor configured to acquire data to create a representation of a current vehicle surrounding, a processor and a memory containing instructions executable by the processor, whereby the device is operative to compare the created representation to a plurality of pre-stored representations of vehicle surroundings, each having at least one risk assessment measure associated with it which stipulates whether to trigger at least one safety mechanism of the vehicle safety system, and if there is correspondence between the created representation and one of the pre-stored representations; detect a vehicle behavior associated with the current surrounding, and adjust, based on the detected vehicle behavior, triggering of at least one safety mechanism associated with the at least one risk assessment measure of the pre-stored representation of the current vehicle surrounding for which there is a match with the created representation.

Advantageously, by creating a representation of the surroundings of the vehicle using any appropriate sensors or systems such as Radar, Lidar or Global Navigation Satellite System (GNSS) sensors, or vision sensors such as cameras, an indication of the real conditions of the vehicle surroundings is obtained.

Thus, the representation may indicate whether the surroundings constitute for example a three- or four-way intersection, a steep curve, a crowded street, etc.

By pre-storing a plurality of representations of surroundings, these could amount to hundreds or even thousands of pre-stored representations, that the vehicle potentially may encounter, and at least one risk assessment measure associated with each pre-stored representation stipulating whether one or more safety mechanisms should be triggered, it is possible to evaluate the created representation of the encountered vehicle surrounding from a risk perspective by finding a pre-stored representation matching the created representation of the vehicle's current surroundings, and control the vehicle safety system accordingly to trigger the safety mechanism.

Depending on detected vehicle behavior, it is advantageously determined whether to adjust triggering of the one or more safety mechanisms of the vehicle safety system.

For instance, the vehicle safety system may trigger a safety measure in the form of a driver alert by indicating to a driver of the vehicle a general security risk of encountered surroundings by visually alerting the driver via an instrument panel display. As an example, in case the vehicle encounters an intersection indicated to be dangerous by the risk assessment measure associated with the pre-stored representation for which there is a match, the safety system may be controlled to alert the driver accordingly. To the contrary, in case the vehicle encounters an intersection indicated by the associated risk assessment measure to be a low-risk intersection, no driver alert is issued.

Advantageously, by detecting a vehicle behavior associated with the current surrounding, it can be determined whether to adapt triggering of the safety mechanism associated with the risk assessment measure of the pre-stored representation of the current vehicle surrounding for which there is a match with the created representation.

In an exemplifying embodiment, a representation of a particular crowded street is created by having a camera of the vehicle safety system capture an image of the intersection. This image is compared to the pre-stored representations until a matching representation is found. The matching provides the risk assessment measure. To exemplify, on an exemplary scale from 0-10, this representation has a risk assessment measure of 7, i.e. a relatively high risk measure.

Now, this risk assessment measure determines whether a particular safety mechanism, such as a driver alert, should be triggered. In an example, it is assumed that the driver alert safety mechanism normally is triggered if the risk assessment measure exceeds a threshold value of T=6 (which is the case in this example with the risk assessment measure amounting to 7).

However, by further taking into account vehicle behavior, the triggering may advantageously be adjusted. In an embodiment, the number of occasions that the vehicle (or driver) has encountered this crowded street before (or a similar street which would have matched the pre-stored representation) is detected. This may be derived from a data stored along with the pre-stored representation for which there is a match with the current surroundings.

Hence, the sensitivity of the safety system could be adjusted by raising or lowering the triggering threshold. Thus, in case the vehicle or driver has encountered this surrounding many times before, the threshold value T is raised to e.g. T=8, and consequently the driver alert is not triggered. As a result, the driver is not "unnecessarily" subjected to an alert on a stretch of road that he or she knows very well, whereas a driver having limited experience of this piece of road indeed will be.

In another scenario, a three-way intersection is encountered, a representation of the particular surrounding is created, and a match is found among the pre-stored representations from which a risk assessment measure is provided. It is assumed that the risk assessment measure of this three-way intersection is 4, i.e. a relatively low measure. As in the previous embodiment, it is assumed that the driver alert safety mechanism is triggered if the risk assessment measure exceeds a threshold value of T=6 (which is not the case in this example with the risk assessment measure amounting to 4). However, by further taking into account the number of times that the vehicle (or driver) has encountered this three-way intersection before (or a similar three-way intersection which would have matched the pre-stored representation), the sensitivity of the safety system could be adjusted by raising or lowering the triggering threshold. Thus, in case the driver has seen this situation just a few times before (or perhaps never at all), the threshold value T is in this embodiment lowered to e.g. T=3, and consequently the driver alert is triggered. Hence, the driver is exposed to an alert on a stretch of road that he or she does not know (even though he or she normally would not have been, without the adjusting of the threshold), whereas a driver having moderate or high experience of this piece of road will not be.

In a further embodiment of the invention, the frequency with which the vehicle has encountered a particular vehicle surrounding is advantageously incremented each time the vehicle encounters the particular vehicle surrounding. Thus, the frequency with which a particular surrounding is encountered is continuously updated.

In another embodiment of the invention, the adjusting of one or more safety mechanisms includes increasing or decreasing an effect of the safety mechanism of the vehicle safety system when subsequently being triggered. Again, in the case of a driver alert, the sensitivity of the system is not necessarily adjusted as described in the above (even though it well may be), but the effect of the safety measures of the vehicle safety system is advantageously increased or decreased when subsequently being triggered. For instance, a less intense driver alert is caused while maintaining the threshold value (such as alerting the driver visually rather than causing an audio signal to be activated).

Hence, assuming for instance that the driver alert is triggered when a stroller occurs on a sidewalk of a crowed street as identified by the created representation; if the crowded street has been rarely encountered by the vehicle, a more intense driver alert is provided by the safety system (in the form of e.g. an audible indication in combination with a visual indication), whereas in case the crowded street is well-known, a less intense driver alert is provided by the safety system (in the form of e.g. a visual indication only).

In still another embodiment of the invention, the adjusting of one or more safety mechanisms includes setting an earlier triggering time for the safety measure of the vehicle safety system in case the risk assessment measure indicates so.

Assuming for instance that the driver alert normally is triggered when a stroller (for example) has moved out onto the street; if in this case the detected vehicle behavior indicates that the crowded street historically has been rarely encountered by the vehicle, the driver alert triggering is advantageously set to occur at an earlier point in time, such as when the stroller approaches the curb, before it is moved out in the street.

In a further embodiment of the invention, the detecting of the vehicle behavior advantageously includes acquiring an indication of how the vehicle has acted in view of prevailing traffic regulations of the current surrounding. Thus, assuming for instance that the car enters an intersection where the driver prior to entering the intersection ignored a stop sign, triggering of a safety mechanism in the form of e.g. an automatic braking system may be adjusted. Thus, even though the safety mechanism normally would not have been triggered in a low-risk intersection, this may be adjusted according to this embodiment such that the safety mechanism nevertheless is triggered, if the driver causes breach of a traffic regulation.

In a further embodiment, vehicle or driver behavior in the form of driver comfort boundaries are detected to determine whether triggering of a safety mechanism should be adjusted or not. The driver comfort boundaries may be defined by parameters such as e.g. maximum speed or acceleration, level of slipperiness of the current stretch of road, presence of game-warning traffic signs, etc.

For instance, assuming that the driver brakes suddenly when approaching an intersection, resulting in a retardation which is outside of a comfort zone of the driver as determined by pre-set driver comfort boundaries, the sensitivity of the safety system may be raised even though the intersection itself has a low risk assessment measure and/or prevailing traffic rules are complied with.

It may further be envisaged that feedback is given in response to behavior of a vehicle or driver. For instance, a driver having experienced a certain vehicle surrounding many times before may not be given a driver alert even though he e.g. does not make a full stop at a STOP sign. However, the safety system may afterwards notify the driver that his behavior may become dangerous. The system may thus coach the driver in view of a detected risky behavior.

Further, not only prevailing traffic regulations may be taken into account, but also historical traffic data or statistics, collected e.g. by a traffic authority or organization and stored in a cloud environment or a remote server such that the vehicle easily and straightforwardly can acquire the historical data of a particular vehicle surrounding, vehicle and/or driver. The device configured to adapt safety mechanisms of a vehicle safety system according to the invention may advantageously further contribute with data pertaining to the vehicle or driver to the remotely stored historical data, thereby continuously building a highly useful database.

BRIEF DESCRIPTION OF THE DRAWINGS

The invention is now described, by way of example, with reference to the accompanying drawings, in which.

DETAILED DESCRIPTION OF THE DRAWINGS

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
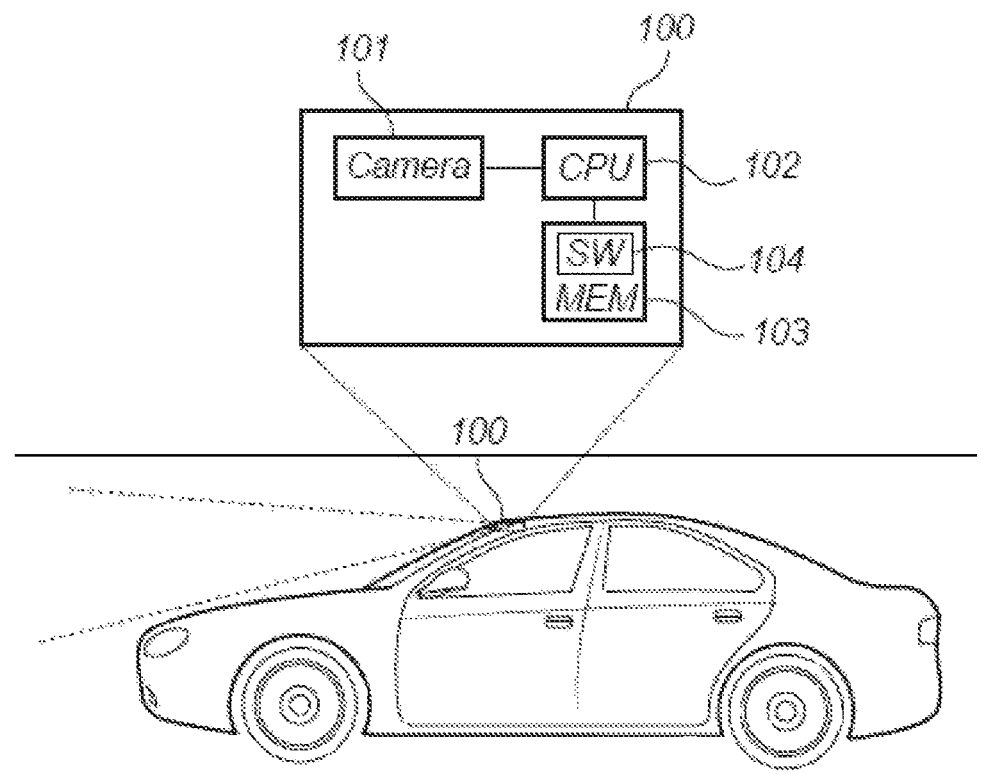
FIG. 1 shows a device configured to adapt safety measures of a vehicle safety system in accordance with an embodiment of the invention.

FIG. 1 illustrates a device 100 configured to adapt safety mechanisms of a vehicle safety system in accordance with an embodiment of the present invention. Safety mechanisms include airbags, automatic brake systems, seatbelt pretensioners, automatic steering systems, visual and audial driver alerts, etc.

The device 100 may include one or more sensors such as Radar, Lidar or GNSS sensors, or vision sensors such as cameras, configured to acquire data to create a representation of a vehicle surrounding. The sensor will in the following example is embodied in the form of a camera 101 utilized to capture images of a surrounding of the motor vehicle being for instance a car 105. The device 100 may for instance be placed in a roof of the car 105 close to a front windshield or alternatively at the very front of the car 105. The camera 101 continuously captures images of the surroundings and supplies image data to a processing device 102 configured to create a representation of the surroundings of the car 105 based on the image data provided the camera 101.

The device 100 further includes a memory 103 for storing pre-stored representations of historically encountered surroundings. These pre-stored representations may be actual representation of real-life surroundings (such as captured images), or realistic models of real-life surroundings. Each pre-stored representation has at least one risk assessment measure associated with it from which the processing device 102 performs a risk assessment for an encountered particular surrounding.

The detected vehicle behavior can be coupled to the car 105 in which the device 100 is arranged or alternatively to a driver of the car 105, in which case face recognition typically may utilized to identify the driver.

In case the detected vehicle behavior is associated with a particular driver, a number of sets of parameter(s) may be associated with each particular driver. Thereby, the adjusting of the triggering of the safety mechanisms can advantageously be customized for each individual driver, and parameters such as sleepiness, attentiveness, accident history of each individual driver, time of driving, etc. Further, by detecting driver behavior of a vehicle, a driver may be treated individually in e.g. families with multiple drivers, car pools, at car rentals, etc.

It should be noted that the pre-stored representations not necessarily are stored locally in the memory 103 of the car 105, but could alternatively be stored remotely on a server or in a cloud environment.

With further reference to FIG. 1, in the device 100, the processing device 102 performs the method according to embodiments of the present invention. This processing device 102 is typically embodied in the form of one or more microprocessors arranged to execute a computer program 104 downloaded to the storage medium 103 associated with the microprocessor, such as a Random Access Memory (RAM), a Flash memory or a hard disk drive. The processing device 102 is arranged to carry out the method according to embodiments of the present invention when the appropriate computer program 104 having computer-executable instructions is downloaded to the storage medium 103 and executed by the processing unit 102. The storage medium 103 may also be a computer program product executing the computer program 104. Alternatively, the computer program 104 may be transferred to the storage medium 103 by means of a suitable computer program product, such as a Digital Versatile Disc (DVD) or a memory stick. As a further alternative, the computer program 104 may be downloaded to the storage medium 103 over a network. The processing unit 102 may alternatively be embodied in the form of a digital signal processor (DSP), an application specific integrated circuit (ASIC), a field-programmable gate array (FPGA), a complex programmable logic device (CPLD), etc.

Figure 2:
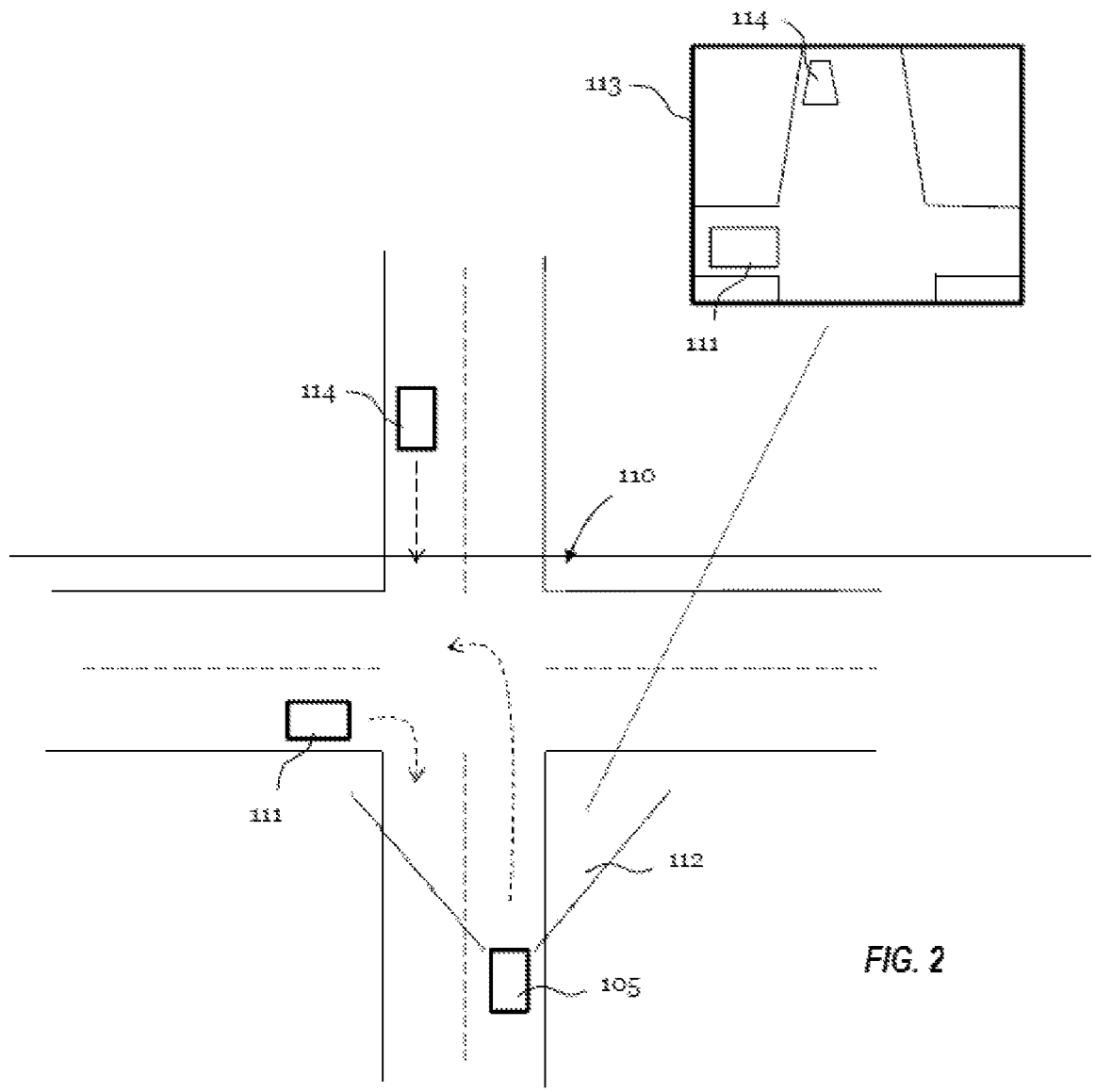
FIG. 2 illustrates a car equipped with the device of FIG. 1, which car approaches a four-way intersection.

FIG. 2 illustrates a first car 105 equipped with the device 100 of FIG. 1, which first car 105 approaches a four-way intersection 110 where a second car 111 is waiting in a right lane of the left leg of the intersection 110 to make a right-turn, while the first car is to make a left-hand turn. A third car 114 approaches the intersection 110 from an opposite direction. A field of view 112 of the camera 101 indicates an area of the surrounding of the car that can be represented by capturing an image 113. The traffic situation of the intersection 110 illustrated in FIG. 2 may from a risk perspective of the first car 105 be considered dangerous due to the risk of a potential collision between the first car 105 and the third car 111 is low, even though a potential collision with the second car 111 is unlikely.

It should be noted that embodiments of the invention will be illustrated in the following with respect to an intersection and a crowded street, but the invention could be applied to any traffic situation where the surroundings are to be evaluated from a risk perspective, such as a steep curve, a roadwork, a stretch of road with plentiful existence of game, etc. Research conducted has shown that intersections and steep curves are particularly prone to accidents. Hence, intersections are challenging for preventive vehicle safety systems.

Figure 3:
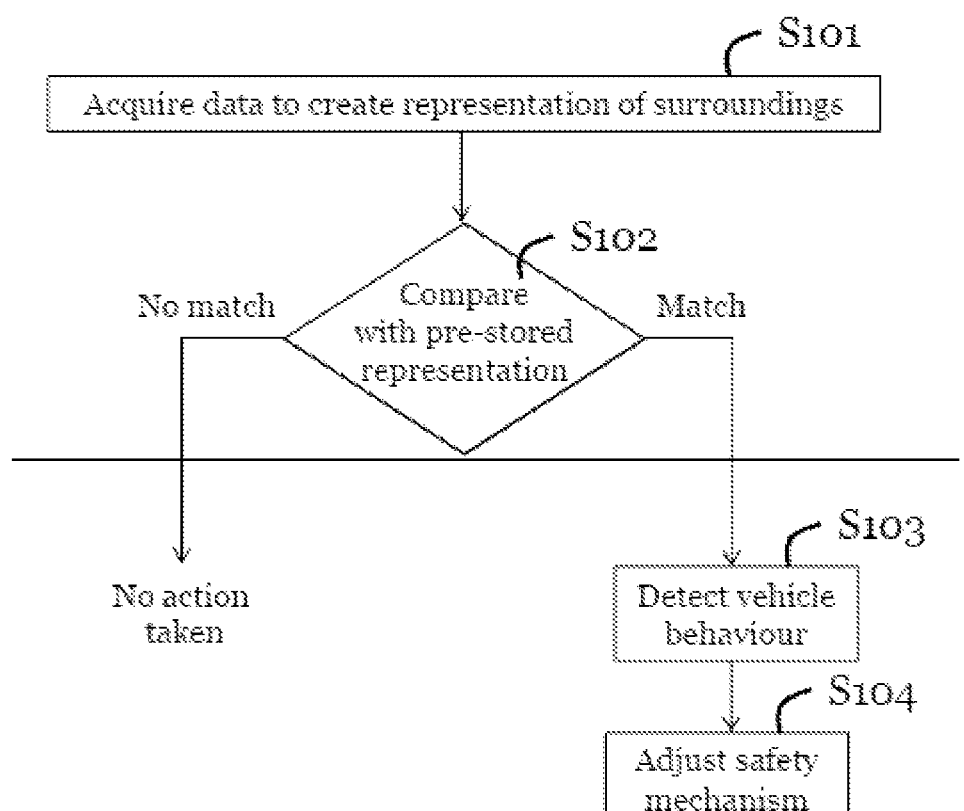
FIG. 3 shows a flowchart illustrating an embodiment of the method of adapting safety mechanisms of a vehicle safety system according to the invention in view of the exemplifying traffic situation of FIG. 2.

FIG. 3 shows a flowchart illustrating an embodiment of the method of adapting safety mechanisms of a vehicle safety system according to the invention in view of the traffic situation of FIG. 2. Reference is further made to FIG. 1 for structural elements. In a first step S101, data is acquired to create a representation of the current vehicle surrounding by having the processor 102 control the camera 101 to capture one or more images 113 of the surroundings of the car 105.

In a second step S102, the created representation, in this case being the image 113, is compared to a plurality of representations of vehicle surroundings being pre-stored in the memory 103. In case of a match, i.e. if the image 113 of the current surrounding corresponds to a pre-stored image, a risk assessment measure R associated with the matching pre-stored image is derived by the processor 102. This derived risk assessment measure R stipulates whether one or more safety mechanisms of the vehicle safety system of the car 105 should be triggered.

In this exemplifying embodiment, the safety mechanism includes a visual driver alert displayed on an information screen of the instrument panel of the car 105, and the current surrounding represented by the image 113, which finds a match with the pre-stored image of the memory 103, has a risk assessment measure of R=7 on a scale from 0 to 10 (as one example scale), i.e. a relatively high measure, as derived from the matching pre-stored image. Further, it is assumed that the driver alert safety mechanism normally is triggered if the risk assessment measure exceeds a threshold value of T=6 (which is the case in this example with the risk assessment measure R>T).

However, by further taking into account vehicle behavior, as is performed in step S103, the triggering may advantageously be adjusted. In this particular embodiment, the detected vehicle behavior is in the form of an indication of the frequency with which the car 105 (or driver in case distinctions are to be made between different drivers of the car 105) previously has encountered this four-way intersection 110 before (or a similar intersection which would have matched the pre-stored representation) is detected. This may be derived from a numeric stored along with the pre-stored representation for which there is a match with the current surroundings, indicating the number of times the car 105 (or driver) historically has encountered this intersection 110.

Hence, based on the detected vehicle behavior, the sensitivity of the safety system may advantageously be adjusted by raising or lowering the triggering threshold T in step S104.

For instance, in case the car 105 or the particular driver of the car 105 has encountered this surrounding many times before, the threshold value T is raised by the process 102 in step S104 to e.g. T=8, thereby decreasing the sensitivity and consequently the driver alert is not triggered. As an alternative, the safety mechanism is adjusted by adjusting its intensity. For instance, a less intense driver alert is caused instead of raising the threshold (such as alerting the driver visually rather than causing an audio signal to be activated). Hence, the driver is not without due cause exposed to an alert on a stretch of road that he knows very well, whereas a driver having limited experience of this piece of road indeed will be.

In an embodiment of the present invention, the frequency with which the car 105 has encountered a particular surrounding is advantageously incremented, each time the vehicle encounters said particular surrounding.

In another exemplifying scenario, it is assumed that the risk assessment measure R of the image pre-stored in the memory 103 for which there is a match with the captured image 113 in step S102 is 4, i.e. a relatively low measure. As in the previous scenario, it is assumed that the driver alert safety mechanism normally is triggered if the risk assessment measure exceeds a threshold value of T=6 (which is not the case in this example with the risk assessment measure R<T).

However, by again taking into account the vehicle behavior in step S103 in the form of the number of times that the car 105 (or driver) has encountered this four-way intersection 110 before (or a similar four-way intersection which would have matched the pre-stored representation), the sensitivity of the safety system may be adjusted by raising or lowering the triggering threshold in step S104. Thus, in this particular scenario, in case the driver has seen this situation just a few times before (or perhaps never at all), the threshold value T is lowered to e.g. T=3, and consequently the driver alert is in fact triggered. Hence, the driver is exposed to an alert on a stretch of road that he does not know even though he normally would not have been, whereas a driver having moderate or high experience of this piece of road will not be.

Figure 4:
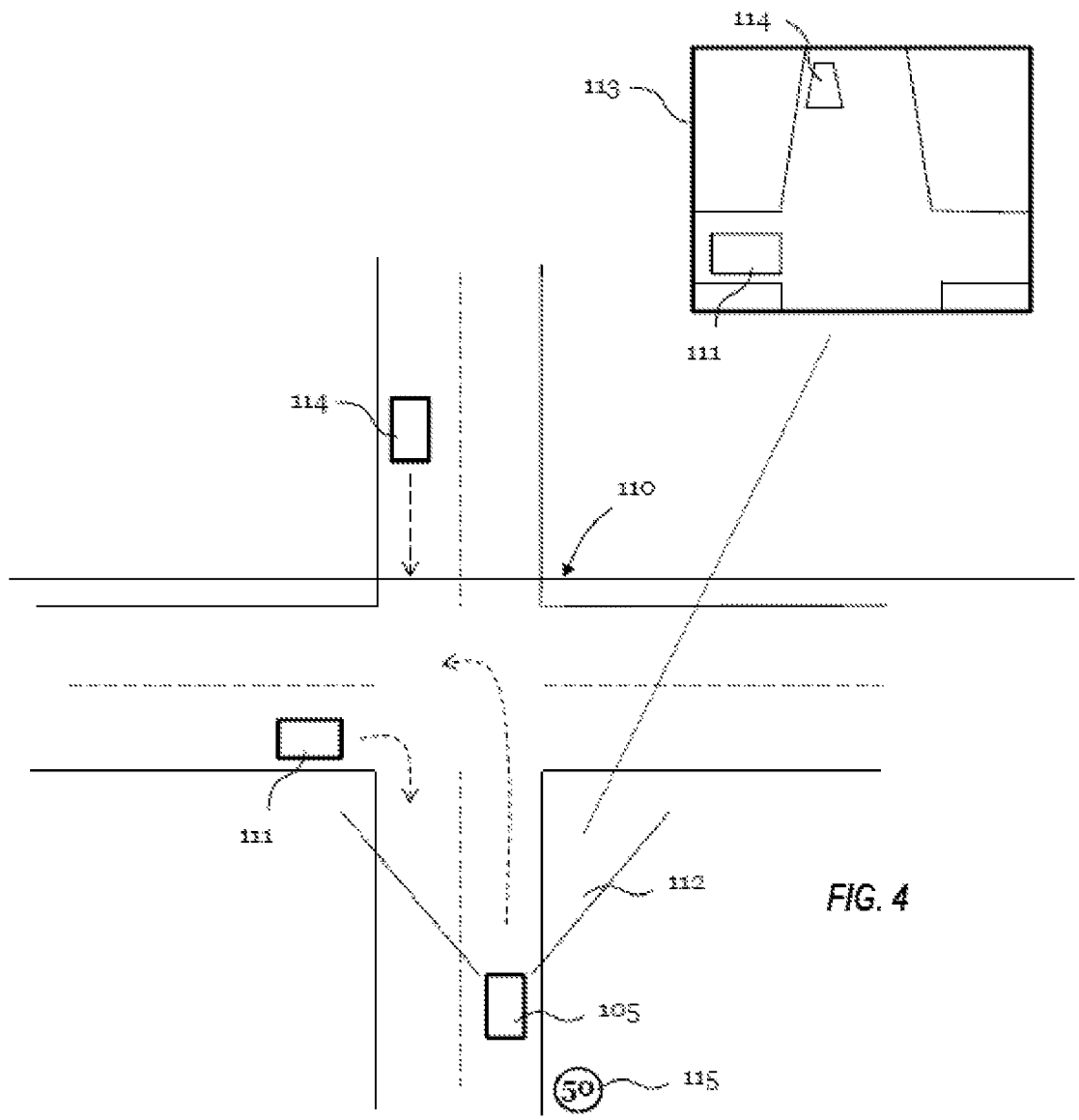
FIG. 4 illustrates a further embodiment of the invention, where a different type of vehicle behavior is taken into account when encountering the traffic situation of FIG. 2.

FIG. 4 illustrates a further embodiment of the invention, where a different type of vehicle behavior is taken into account. In this embodiment, the same four-way intersection 110 as in FIG. 2 is approached by the car 105, but additionally a traffic sign 115 indicating a maximum allowable speed of 50 km/h is approached by the car 105. Reference is again made to the flowchart of FIG. 3.

In a first step S101, the processor 102 controls the camera 101 to capture one or more images 113 of the surroundings of the car 105 in order to create a representation of the current surrounding.

In a second step S102, the image 113 is compared to a plurality of images of surroundings being pre-stored in the memory 103. In case of a match, i.e. if the image 113 of the current surrounding corresponds to a pre-stored image, a risk assessment measure associated with the matching pre-stored image is derived by the processor 102. This derived risk assessment measure stipulates whether one or more safety mechanisms of the vehicle safety system of the car 105 should be triggered.

In this exemplifying embodiment, the safety mechanism comprises an automatic braking system causing the car 105 to slow down, if considered necessary by the vehicle safety system, Further, the current surrounding represented by the image 113, which finds a match with the pre-stored image of the memory 103, has a risk assessment measure of R=7 on a scale from 0 to 10, i.e. a relatively high measure, as derived from the matching pre-stored image. Further, it is assumed that the automatic braking safety mechanism normally is triggered if the risk assessment measure exceeds a threshold value of T=8 (which is not the case in this example with R<T). Hence, automatic braking should normally only be utilized in high-risk scenarios.

However, by further taking into account vehicle behavior, as is performed in step S103, the triggering may advantageously be adjusted. In this particular embodiment, the detected vehicle behavior includes an indication of how the car 105 has acted in view of prevailing traffic regulations of the current surrounding.

Hence, the camera 101 captures an image of the traffic sign 115 and the processor 102 determines from the image whether the car 105 actually slows down to a speed below 50 km/h when approaching the intersection 110. Based on the detected vehicle behavior, the sensitivity of the safety system may advantageously be adjusted by raising or lowering the triggering threshold T in step S104.

For instance, in case the processor 102 concludes in step S103 that the car 105 has not slowed to under the maximally allowed 50 km/h, which may imply a recklessness of the driver, the level of the vehicle safety system required to trigger the automatic braking is adjusted in that the threshold value T is lowered down to e.g. T=6 in step S104, thereby advantageously increasing the sensitivity and consequently the automatic braking mechanism is triggered (as R>T with the adjusted threshold value) and the car 105 will slow down to an appropriate speed as determined by the vehicle safety system.

In an alternative or complementing embodiment, the adjusting of the triggering of the automatic braking control mechanism is advantageously undertaken by setting the triggering to occur at an earlier point in time than what normally would be done under the given circumstances.

It should be noted that different types of vehicle behaviors may be combined when adjusting the triggering of the safety mechanism. For instance, both the frequency with which the car 105 (or the driver) encounters the intersection 110, and the speed of the car 105 when passing the traffic sign 115, is taken into account when adjusting the threshold value T. For instance, if the car 105 infrequently has encountered the intersection in the past, the threshold value is decremented by one, and if the driver is prone to driving too fast, the threshold value is decremented by another step.

Figure 5:
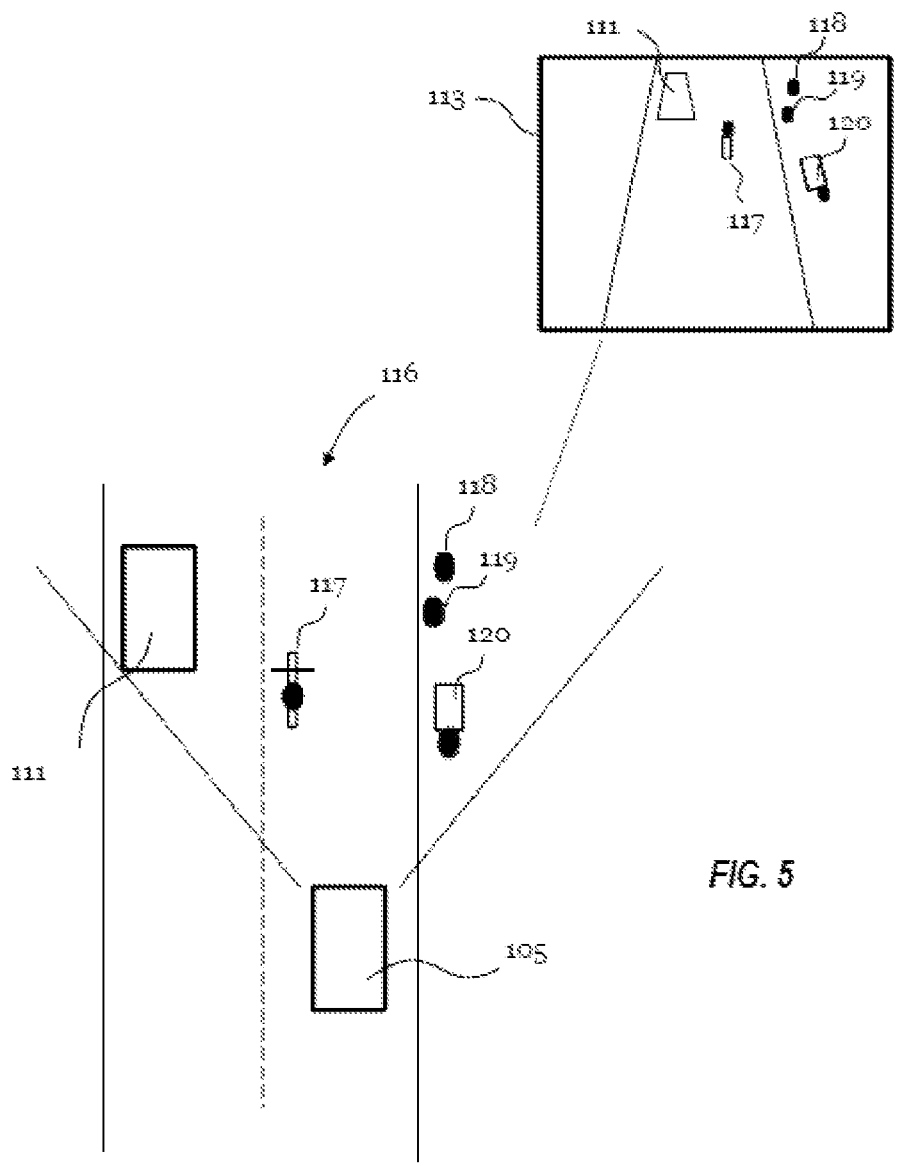
FIG. 5 illustrates a different scenario in which the device and method of the invention is implemented.

FIG. 5 illustrates a different scenario, where the current surrounding is a crowded street 116 with an oncoming car 111, a bicycle 117, a couple of pedestrians 118, 119 and a stroller 120 occurring on a sidewalk of the street 116. Such a scenario may warrant a driver alert being triggered by the safety system. Reference is further made to FIG. 3 for a flowchart.

Hence, in a first step S101, data is acquired to create a representation of the current vehicle surrounding by having the processor 102 control the camera 101 to capture one or more images 113 of the surroundings of the car 105.

In a second step S102, the captured image 113 is compared to a plurality of images of vehicle surroundings being pre-stored in the memory 103. In case of a match, a risk assessment measure R associated with the matching pre-stored image is derived by the processor 102. This derived risk assessment measure stipulates whether the driver alert of the vehicle safety system of the car 105 should be triggered.

In this exemplifying embodiment, the current surrounding represented by the image 113, which finds a match with the pre-stored image of the memory 103, has a risk assessment measure of R=7 as derived from the matching pre-stored image. Further, it is assumed that the driver alert safety mechanism normally is triggered if the risk assessment measure exceeds a threshold value of T=6 (which is the case in this example with the risk assessment measure R>T).

However, by further taking into account vehicle behavior, as is performed in step S103, the triggering may advantageously be adjusted. In this particular embodiment, the detected vehicle behavior comprises an indication of the frequency with which the car 105 (or driver in case distinctions are to be made between different drivers of the car 105) previously has encountered this crowded street 116 before (or a similar intersection which would have matched the pre-stored representation) is detected. This may be derived from a numeric stored along with the pre-stored representation for which there is a match with the current surroundings, indicating the number of times the car 105 (or driver) historically has encountered this street 116.

Hence, based on the detected vehicle behavior, the sensitivity of the safety system may advantageously be adjusted by raising or lowering the triggering threshold T in step S104.

For instance, in case the car 105 or the particular driver of the car 105 has encountered this surrounding many times before, the threshold value T is raised by the processor 102 in step S104 to e.g. T=8, thereby decreasing the sensitivity and consequently the driver alert is not triggered, since R<T.

Figure 6:
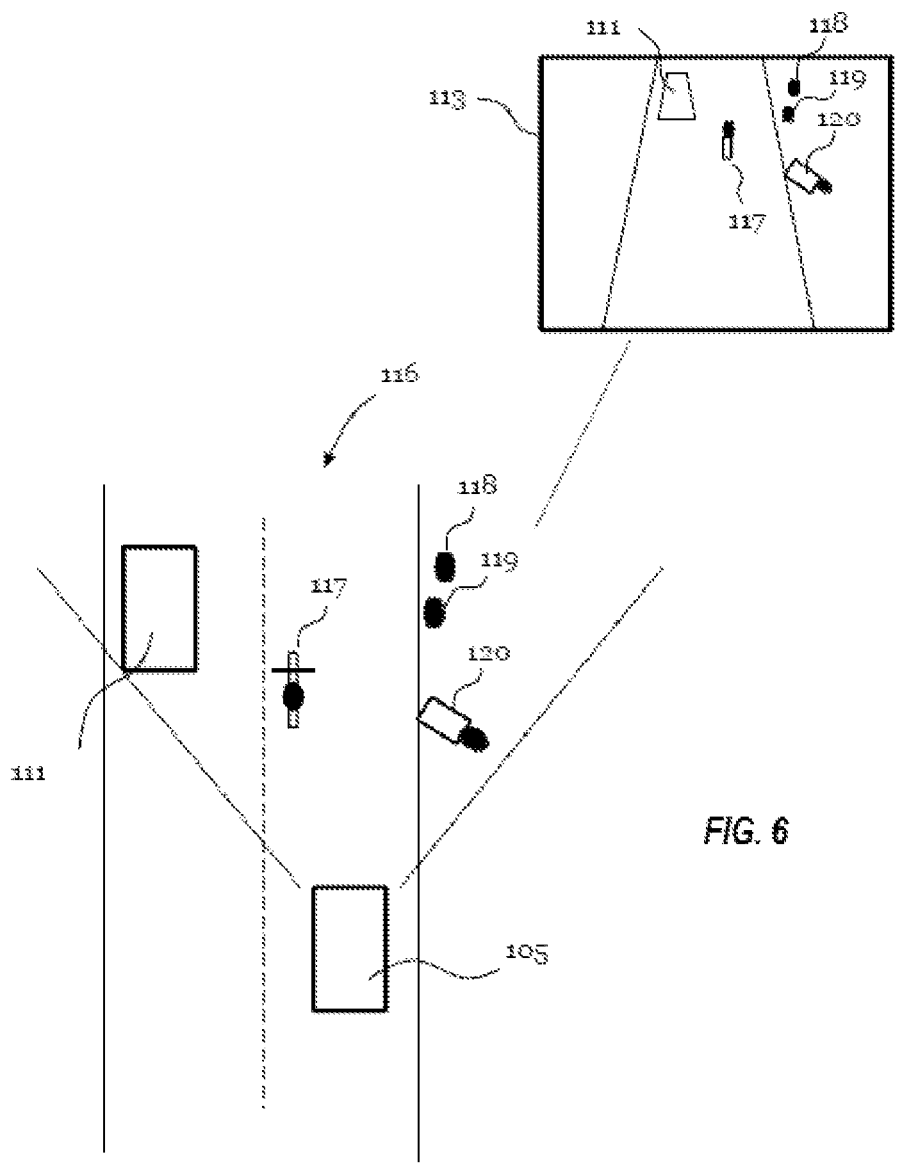
FIG. 6 illustrates yet a different scenario in which the device and method of the invention is implemented.

FIG. 6 shows a scenario similar to that of FIG. 5, but where the stroller 120 is about to move from the sidewalk and out onto the street. In this scenario, after having captured the image 113 in step S101 and found a matching pre-stored image in step S102, it is found that the risk assessment measure R associated with matching image is R=9, mainly due to the fact that the stroller 120 moves out into the street.

Hence, even though it is detected in step S103 that the car 105 (or the particular driver of the car 105) has encountered this surrounding many times before, and the threshold value T is raised by the processor 102 in step S104 to. T=8, thereby decreasing the sensitivity, the driver alert will nonetheless be triggered due to the high-risk profile of the crowded street 116 with a stroller 120 moving out into the street resulting in a risk assessment measure of R=9.

In another embodiment of the invention, the adapting of one or more safety mechanisms includes increasing or decreasing an effect of the safety mechanism of the vehicle safety system when subsequently being triggered. Again, in the case of a driver alert, the sensitivity of the system is not necessarily adjusted based on the detected vehicle (or driver) behavior as described in the above (even though it well may be), but the effect of the safety mechanisms of the vehicle safety system is advantageously increased or decreased when subsequently being triggered.

Hence, assuming for instance that the driver alert is triggered when the stroller 120 occurs on a sidewalk of the crowed street 116 as identified by the created representation; if the crowded street 116 has been rarely encountered by the car 105, a more intense driver alert is provided by the safety system (in the form of e.g. an audible indication in combination with a visual indication), whereas in case the crowded street 116 is well-known, a less intense driver alert is provided by the safety system (in the form of e.g. a visual indication only).

In still another embodiment of the invention, the adapting of one or more safety mechanisms examples include setting an earlier triggering time for the safety mechanism of the vehicle safety system in case the risk assessment measure indicates so.

Assuming for instance that the driver alert normally is triggered when a stroller 120 has moved out onto the street 116; if in this case the safety assessment measure associated with the representation matching the current surroundings indicates that the crowded street historically has been rarely encountered by the vehicle, the driver alert triggering is advantageously set to occur at an earlier point in time, such as when the stroller 120 approaches the curb, before it is moved out in the street 116.

As can be concluded from the above, preventive safety systems will need to be able to adapt triggering thresholds and safety mechanism to be successful in avoiding accidents and even in saving lives, while avoiding unnecessary triggering of the safety mechanism.

While the above description constitutes the preferred embodiment of the present invention, it will be appreciated that the invention is susceptible to modification, variation and change without departing from the proper scope and fair meaning of the accompanying claims.

The invention claimed is:

1. A method for a vehicle of controlling a safety mechanism of a vehicle safety system of the vehicle, comprising, the steps of;
   acquiring data via at least one sensor to create a representation via a processing unit of a computing device of a current vehicle surrounding;
   comparing, via the processing unit, the representation of a current vehicle surrounding to a plurality of pre-stored representations of vehicle surroundings stored in a memory unit in communication with the processing unit, each of the pre-stored representations vehicle surroundings having at least one associated risk assessment measure which stipulates whether to trigger the safety mechanism of the vehicle safety system when there is correspondence between the representation of a current vehicle surrounding and one of the pre-stored representations of vehicle surroundings;
   detecting, via the processing unit, a vehicle behavior associated with the representation of a current vehicle surrounding; and
   adjusting, via the processing unit, the triggering of the safety mechanism based on the detected vehicle behavior and the at least one risk assessment measure of the pre-stored representation of the vehicle surrounding for which there is a match with the representation of a current vehicle surrounding.

2. The method according to claim 1, wherein the adjusting the triggering of the safety mechanism includes adjusting a level of the at least one risk assessment measure required to trigger the safety mechanism of the vehicle safety system.

3. The method according to claim 1, wherein the adjusting of the triggering of the safety mechanism includes adjusting an effect of the safety mechanism of the vehicle safety system when subsequently being triggered.

4. The method according to claim 1, wherein the adjusting of the triggering of the safety mechanism includes adjusting a triggering time of the safety mechanism of the vehicle safety system.

5. The method according to claim 1, wherein the detecting of a vehicle behavior includes detecting a vehicle behavior of an individual driver of the vehicle associated with the current surrounding.

6. The method according to claim 1, wherein the detecting a vehicle behavior includes acquiring an indication of how the vehicle has acted in view of prevailing traffic regulations of the current vehicle surrounding.

7. The method according to claim 1, wherein the adjusting of the triggering of the safety mechanism includes setting a triggering threshold for the safety mechanism, which triggering threshold is adjusted based upon the risk assessment measure.

8. The method according to claim 5, wherein the adjusting of the triggering of the safety mechanism includes setting a triggering threshold for the safety mechanism, which triggering threshold is adjusted based upon the risk assessment measure and the behavior of the individual driver.

9. A method for a vehicle of controlling a safety mechanism of a vehicle safety system of the vehicle, comprising, the steps of;
   acquiring data via at least one sensor to create a representation via a processing unit of a computing device of a current vehicle surrounding;
   comparing, via the processing unit, the representation of a current vehicle surrounding to a plurality of pre-stored representations of vehicle surroundings stored in a memory unit in communication with the processing unit, each of the pre-stored representations vehicle surroundings having at least one associated risk assessment measure which stipulates whether to trigger the safety mechanism of the vehicle safety system when there is correspondence between the representation of a current vehicle surrounding and one of the pre-stored representations of vehicle surroundings;
   detecting, via the processing unit, a vehicle behavior associated with the representation of a current vehicle surrounding; and
   adjusting, via the processing unit, the triggering of the safety mechanism based on the detected vehicle behavior and the at least one risk assessment measure of the pre-stored representation of the vehicle surrounding for which there is a match with the representation of a current vehicle surrounding
   wherein the detecting a vehicle behavior includes acquiring an indication of a frequency with which the vehicle previously has encountered the current vehicle surrounding.

10. The method according to claim 9, wherein the level of the risk assessment measure required to trigger the safety mechanism of the vehicle safety system is lowered if the vehicle infrequently has encountered the current vehicle surrounding or if the vehicle does not comply with a prevailing traffic regulation.

11. The method according to claim 10, wherein the level of the risk assessment measure required to trigger the safety mechanism of the vehicle safety system is raised if the vehicle frequently has encountered the current vehicle surrounding or if the vehicle complies with the prevailing traffic regulation.

12. The method according to claim 9, wherein the detecting of the vehicle behavior includes incrementing the frequency with which the vehicle has encountered a particular current vehicle surrounding each time the vehicle encounters the particular vehicle surrounding.

13. A device for a motor vehicle configured to control a safety mechanism of a vehicle safety system, comprising:

a sensor configured to acquire data to create a representation of a current vehicle surrounding, a processor; and a memory containing instructions executable by the processor, whereby the device is configured to;

compare the representation of a current vehicle surrounding to a plurality of pre-stored representations of vehicle surroundings, each pre-stored representation having at least one risk assessment measure associated with it which stipulates whether to trigger the safety mechanism of the vehicle safety system when there is correspondence between the created representation and one of the pre-stored representations, the processor further configured to detect a vehicle behavior associated with the current vehicle surrounding; and the processor further configured to adjust, based on the detected vehicle behavior, a triggering of the safety mechanism associated with the at least one risk assessment measure of the pre-stored representation of the current vehicle surrounding for which there is a match with the created representation.

14. The device according to claim 13, wherein the device is further configured to, when adjusting the triggering of the safety mechanism, adjust a level of the at least one risk assessment measure required to trigger the safety mechanism of the vehicle safety system.

15. The device according to claim 13, wherein the device is further configured to, when detecting the vehicle behavior; detect a behavior of an individual driver of the vehicle associated with the current vehicle surrounding.

16. A non-transitory computer storage medium storing thereon a computer program product comprising computer-executable instructions configured to be executed on a computer to implement the method for a vehicle of controlling a safety mechanism of a vehicle safety system of the vehicle according to claim 1.

17. The non-transitory computer storage medium according to claim 16, wherein the adjusting of the triggering of the safety mechanism includes setting a triggering threshold for the safety mechanism, which triggering threshold is adjusted based upon the risk assessment measure.

* * * * *